April 18, 1967 R. M. BELTRAMO ET AL 3,315,225
SIGNAL DEVICE AND RHEOSTAT PROTECTOR FOR VEHICLE
ELECTROMAGNETIC BRAKE CONTROLLERS
Filed Dec. 5, 1963
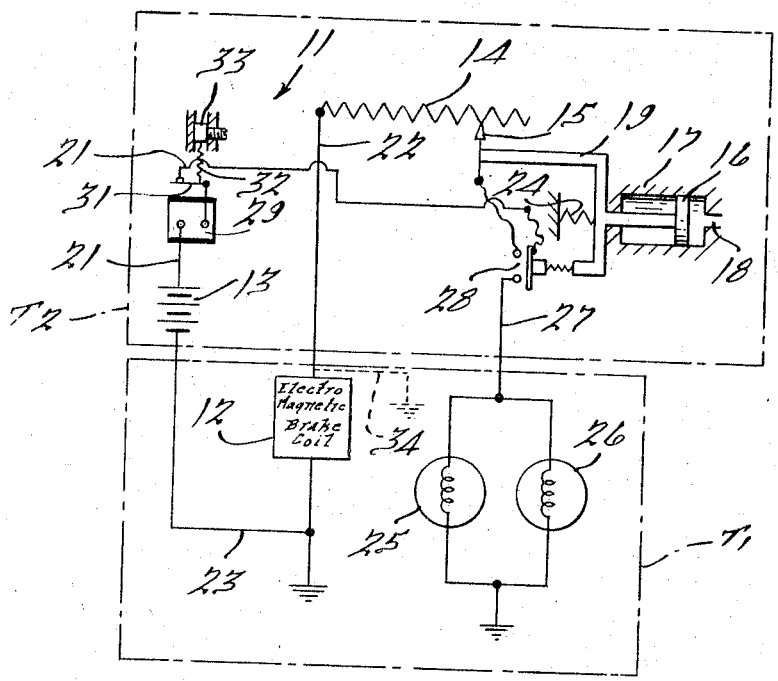
INVENTORS.
Renaldo M. Beltramo
Edward A. Schilling.
BY
Harness, Dickey & Pierce
ATTORNEYS

United States Patent Office 3,315,225
Patented Apr. 18, 1967

3,315,225
SIGNAL DEVICE AND RHEOSTAT PROTECTOR FOR VEHICLE ELECTROMAGNETIC BRAKE CONTROLLERS
Renaldo M. Beltramo, Royal Oak, and Edward A. Schilling, Drayton Plains, Mich., assignors to Syncro Corporation, Oxford, Mich., a corporation of Michigan
Filed Dec. 5, 1963, Ser. No. 328,262
4 Claims. (Cl. 340—69)

This invention relates to protectors for brake controllers, and more particularly to means for protecting the rheostat in electromagnetic braking systems against excessive currents due to short circuits.

It is an object of the invention to provide a novel and improved protector for brake controllers which, while affording protection for the rheostat and brake coil, will also draw the attention of the operator to the existence of the short circuit.

It is another object to provide an improved brake controller of this type which under certain conditions will perform its protective and signaling functions while still supplying some current to the electromagnetic brake coil, thus not depriving the operator of a braking effect.

Other objects, features, and advantages of the present invention will become apparent from the subsequent description, taken in conjunction with the accompanying drawing.

In the drawing:

The figure is an electrical circuit diagram showing an electromagnetic brake coil controller together with the novel protector of this invention.

Briefly, the invention is adapted for use in conjunction with a system in which the current to an electromagnetic brake coil for a vehicle trailer is controlled by a rheostat actuatable, for example, in conjunction with the hydraulic brakes of the tractor or towing vehicle. The invention comprises a vibrating current-sensitive relay in series with the rheostat, with the relay being so adjusted that it will remain closed as long as the current passing through the rheostat does not exceed a rated or safe value. Should a complete or partial short circuit cause excessive current to flow, the relay will open and close rapidly, thus decreasing the average current to a safe limit, and at the same time creating an audible signal so that the operator will be apprised of the condition. Should the short circuit around the brake coil be of a resistive type rather than a complete short, a lesser but still substantial amount of current will be supplied to the brake coil while the relay is vibrating, thus assuring some braking action. Regardless of whether some current is still supplied to the brake coil during the period of the short circuit, opening of the short circuit will immediately result in full and complete operation of the controller.

Referring more particularly to the drawing, the circuit is generally indicated at 11 and comprises an electromagnetic brake coil 12 connected to a battery 13 through a rheostat 14. Coil 12 may be part of a brake on a vehicle trailer T₁ which is being towed by a tractor or towing vehicle T₂ having a hydraulic braking system of its own. In such arrangements, it is desirable to actuate the trailer and tractor brakes simultaneously and in the same proportion. Rheostat 14 therefore has a movable contact 15 which is actuatable by a piston 16 sliding within a cylinder 17, the cylinder having a port 18 connected to the hydraulic braking system of the tractor. An arm 19 connects piston 16 to contact 15 so that fluid pressure at port 18 will cause contact 15 to move along the winding of rheostat 14. An electrical conductor 21 connects the positive terminal of battery 13 to contact 15 through a switch described below, and a conductor 22 connects one end of rheostat 14 with one terminal of brake coil 12, the other terminal being connected to the battery by a conduit 23 which may be grounded. Increased pressure within cylinder 17 will cause contact 15 to move in a direction lessening the resistance between conductors 21 and 22, thus increasing the current to brake coil 12. Return spring means 24 is provided for returning piston 16 and contact 15 toward its released position when the pressure at port 18 is diminished, thus deenergizing coil 12 to stop the braking effect.

The figure also shows a pair of stop lights 25 and 26 connected to conduit 21 by a conduit 27 and a switch 28 closable by movement of arm 19 away from its released position so that the stop lights will be illuminated to indicate that the trailer brake is being applied. Switch 28 also opens and closes the circuit between conduit 21 and contact 15, so as to insure total deenergization of brake coil 12 when the tractor braking system is released.

In accordance with the invention, a vibrating current-sensitive relay 29 is placed in conductor 21, the relay having a switch 31 which is normally held closed by a spring 32 but will open when the current in relay 29 exceeds an amount as predetermined by the tension on spring 32, this tension being adjustable by means 33. Switch 31 is in series with relay 29, so that opening of the switch will deenergize the relay, permitting the switch to close. Such a vibrating type of current-sensitive relay is in itself known, and the vibration of switch 31 will be audible to an operator of the tractor vehicle, relay 29 being mounted adjacent the driver's seat.

In operation, the tension of spring 32 will normally be set so that switch 31 will open when the current in relay 29 exceeds an amount equal to a preselected safe maximum current for resistor 14 plus the current drawn by lamps 25 and 26. If the lamp circuit is connected to battery 13 separately, that is, if conductor 27 is connected directly to the positive terminal of the battery rather than on the other side of relay 29, the relay will be set so as to open when its current exceeds the safe limit of resistor 14 itself, and the current capability of relay 29 need therefore be less.

Normally, with the setting of relay 29, the relay switch will remain closed, and the amount of current to coil 12 will be proportional to the setting of contact 15, which in turn will be controlled by the fluid pressure at conduit 18, or by manual control of connection 19 if such is provided.

Let us assume that a short circuit indicated in dashed lines at 34 occurs between conductor 22 and ground, that is, around coil 12. Such a short circuit in most cases will be a partial or intermittent one due to dragging of an electrical cable on the road, or the wearing of an insulative conductor sheath due to vibration and frictional contact with a grounded part of the tractor or trailer. This type of a short circuit may be referred to as a resistive type, since it will still offer substantial resistance to the passage of current, even though it greatly increases the total current being drawn from battery 13 through rheostat 14. If the current exceeds the amount for which relay 29 has been preset, switch 31 will begin to rapidly open or close, the audible sound of this vibration warning the operator of the short circuit condition. The opening and closing of switch 31 will prevent the average current from being maintained at the excessive level which would otherwise occur, and will therefore prevent damage to rheostat 14 as well as to the other portions of the circuit.

At the same time, assuming that short circuit 34 is of a resistive type, there will still be a substantial amount of current supplied to brake coil 12. For example, assuming that piston 16 can shift contact 15 to a left hand or full braking position in the figure at which 10 amps are normally drawn through coil 12, relay 29 may be set to open when 12 amps pass through it. If the presence of short circuit 34 causes an additional 6 amps to flow through rheostat 14, the vibration of relay 29 will prevent this excessive current of 16 amps from being maintained. The average current will drop to a level at or slightly below 10 amps, even at the full brake setting (left hand position of contact 15) as long as relay 29 continues to vibrate. This will mean that at the full brake setting, coil 12 will be supplied with about perhaps 6 or 7 amps instead of the 10 amps which it normally would receive. This will permit a substantial amount of braking force to be applied to the trailer, thus maintaining a relatively safe condition for the tractor-trailer combination.

Of course, if short circuit 34 is a complete short circuit, no current could be supplied to brake coil 12 even while relay 29 continues to vibrate, but in this case as well, rheostat 14 will be protected from excessive current. It must be realized that if rheostat 14 is damaged, the entire braking system might well become inoperative.

In the system shown, a partial or complete short circuit in the subcircuit which supplies lamps 25, 26 will also cause vibration of relay 29 if the short circuit results in a current within the relay exceeding that for which it is set to vibrate. Even though a short circuit in the lamp subcircuit might not adversely effect rheostat 14, relay 29 will give warning of the presence of such a short circuit by its audible vibration.

In any event, as soon as the short circuit 34 or other short circuit causing vibration of relay 29 is eliminated, switch 31 of the relay will close and will remain closed. This means in effect that the operator will instantly have full and complete control of the braking system of which coil 12 is a part. This is of great advantage when one realizes that many of the short circuits which will occur in the actual use of a tractor-trailer combination will be of an intermittent nature or of short duration, due to the factors mentioned above. The invention accomplishes the purpose of protecting the brake controller rheostat in such cases, while not hampering the operator any more than necessary in the operation of the tractor and trailer. This overcomes a disadvantage of other types of protectors, such as bimetal protectors, in which it is necessary to wait until the bimetal cools before the circuit will reclose and can be used.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. In combination with a tractor-mounted brake controller for an electromagnetic trailer brake coil of the type having a battery and rheostat in series with said brake coil and a movable contact for adjusting said rheostat between a brake-released position in which said rheostat offers maximum resistance to current flow and a full braking position in which said rheostat offers minimum resistance to current flow, protecting means for said circuit comprising an audibly vibrating current-sensitive relay mounted adjacent the tractor driver and having a coil connected in series between one terminal of said battery and said rheostat, one side of said rheostat being connected to one side of said brake coil, the other side of said brake coil being connected to another battery terminal and to ground, a switch forming part of said relay, resilient means urging said switch to a normally closed position, and means for adjusting the force exerted by said resilient means on said switch whereby said relay may be set to vibrate only when a predetermined current is exceeded in said relay coil.

2. In combination with a tractor-mounted brake controller for an electromagnetic trailer brake coil of the type having a battery and rheostat in series with said brake coil, a stop light circuit connected in circuit with said battery and operable in accordance with the operation of said brake coil, and a movable contact for adjusting said rheostat between a brake-released position in which said rheostat offers maximum resistance to current flow and a full braking position in which said rheostat offers minimum resistance to current flow, protecting means for said circuit comprising an audibly vibrating current-sensitive relay mounted adjacent the tractor driver and having a coil connected in series between one terminal of said battery and said rheostat, one side of said rheostat being connected to one side of said brake coil, the other side of said brake coil being connected to another battery terminal and to ground, a switch forming part of said relay, resilient means urging said switch to a normally closed position, and means for adjusting the force exerted by said resilient means on said switch whereby said relay may be set to vibrate only when a predetermined current is exceeded in said relay coil.

3. In combination with a tractor mounted vehicle brake controller circuit for an electromagnetic brake coil of the type having a battery and a rheostat in series circuit with said coil, protecting means for protecting said rheostat from burn out due to excessively high currents by intermittently opening and closing said series circuit to said rheostat upon the occurrence of current flow to the rheostat of a preselected high magnitude and limiting the average current flow to the rheostat, said protecting means comprising a vibrating current sensitive relay in said series circuit with said battery, rheostat and brake coil, said relay being normally in a closed circuit condition, means normally holding said relay in said closed circuit condition, said means being adjustable to preselect the current required to open said relay at said preselected high magnitude.

4. The combination according to claim 3, said relay being of the type which is audible when vibrating and being mounted adjacent the vehicle driver.

References Cited by the Examiner
UNITED STATES PATENTS 1,661,625  3/1928  Pieper _____ 188—159

NEIL C. READ, *Primary Examiner.*

A. H. WARING, *Assistant Examiner.*